United States Patent Office 3,207,708
Patented Sept. 21, 1965

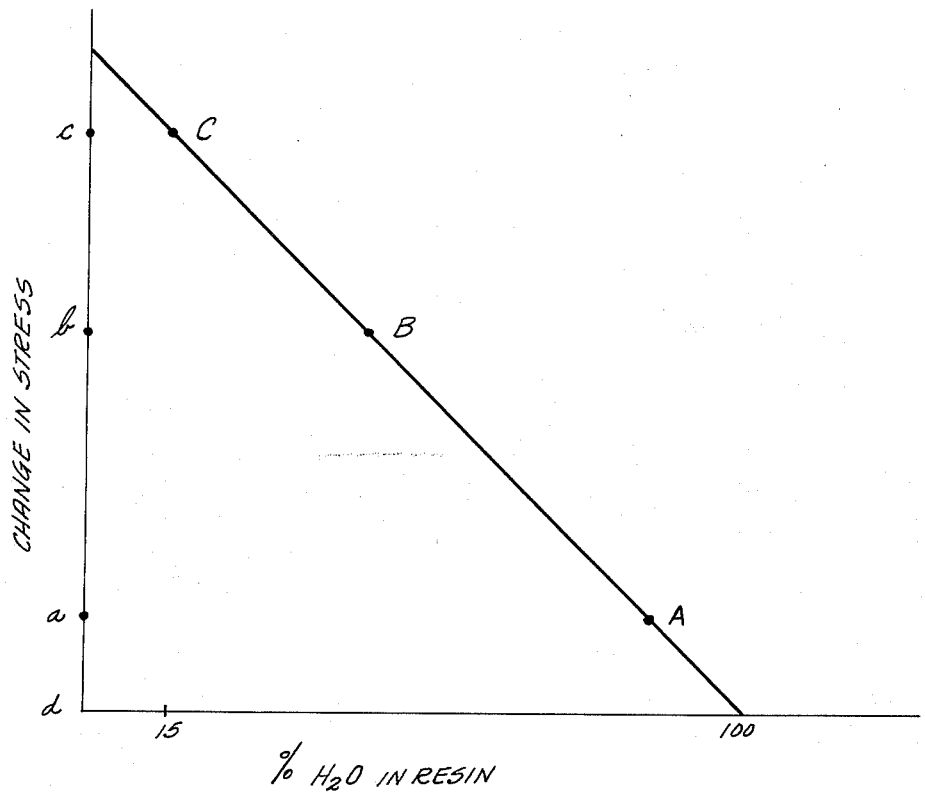

3,207,708
PROCESS OF MAKING AN ION
EXCHANGE MEMBRANE
Eugene Arthur Oster, Jr., Hamilton, and Arnold Perry Fickett, Lynn, Mass., assignors to General Electric Company, a corporation of New York
Filed Feb. 23, 1961, Ser. No. 91,141
5 Claims. (Cl. 260—2.2)

This invention relates to ion exchange resins and more particularly, to ion exchange resin membranes and a method of making such membranes of improved mechanical stability.

Ion exchange resins when formed into membranes have been shown to be particularly useful in fuel cells such as of the type disclosed and claimed in the patent to Grubb, 2,913,511, in which the ion exchange membrane acts not only as the electrolyte but also as a physical barrier separating the fuel and oxidant fluids such as gases. If the membrane should fail as a barrier, the two fluids would mix resulting in a reduction in the usefulness of the cell.

Therefore, one object of this invention is to provide an improved ion exchange membrane more resistant to failure as a barrier than known membranes.

It is well known that ion exchange resins can be prepared by polymerizing a mixture of ingredients, one of which contains an ionic substitute. It the case of cation exchange resins with which this invention is particularly concerned, these ionic groups are acidic groups such as the sulfonic acid group. The ionizable group is attached to a polymeric compound such as a phenolformaldehyde resin. Thus, a typical cation exchange resin may be prepared by copolymerizing p-phenolsulfonic acid with formaldehyde. The preparation and properties of the number of different types of ion exchange resins are described throughout the literature.

The formation of these ion exchange resins into membrane or sheet form is also well known in the art. The preparation of a number of different types of ion exchange membranes is described in Patent Re. 24,865, Juda et al. and 2,702,272, Kasper.

As a general rule, ion exchange resins are formed in aqueous solutions or emulsions of various types of organic compounds so that when the membrane is formed, it is substantially saturated with water. Thus, a phenolsulfonic acid-formaldehyde resin is found to contain a plurality of reactive cites consisting of —$SO_3H$ radicals attached to the resin matrix, with sufficient water being held in the resin matrix by Van der Waals force so that the H+ ion is extremely mobile in the resin matrix. In this form the resin is described as being hydrated. The term "hydrated" means that the resin contains enough water to substantially saturate the resin but the resin is not necessarily "wet" in the usual sense. The amount of water in a hydrated ion exchange resin may vary within wide limits depending on the particular composition of the resin and its physical structure. This water of hydration can be removed from the resinous material during operation in a fuel cell. Therefore during the operation of the fuel cell such as of the type described by Grubb, 2,913,511, without external supply of water, the ion exchange membrane will tend to dehydrate and shrink during operation. Shrinking of the membrane can place the frame-mounted resin in tension. After a certain limit is reached, the resin will relieve excessive tension stresses either by cracking or by pulling away from and baring openings in reinforcing materials such as a cloth around which the resin was cast. Thus the barrier between the two reactant fluids, such as gases, is destroyed.

One known method of making ion exchange resins includes mixing a 37 weight percent water solution of formaldehyde, herein referred to as "formalin," with p-phenolsulfonic acid to result in an ion exchange membrane which, in its "as cast" or "as molded" form prior to any additional hydration, includes substantially more water than does the resin or membrane of this invention. This occurs because of the higher water content of the initial ingredients used in the known methods.

A principal object of this invention is to provide a method for making an improved ion exchange resin and membrane from that resin suitable for use in fuel cell applications, the membrane in its "as cast" or "as molded" condition containing less water than known membranes in that same condition.

Another object is to provide an ion exchange resin which can produce a membrane more stable to internal shrinkage forces.

These and other objects and advantages will be more readily understood from the following detailed description, the examples and the drawing, all of which are meant to be illustrative of rather than limitations on the scope of this invention.

The drawing is a graphical representation of the change in stress conditions in an ion exchange resin with change in water content.

Briefly stated, this invention in one form comprises in a method of making an ion exchange resin, the step of making a mixture of formalin, paraformaldehyde and paraphenolsulfonic acid such that the mixture includes 1–3 parts by weight of formalin to 1 part by weight of paraformaldehyde (i.e., a combination of the two would consist of 50–75 weight percent formalin and 25–50 weight percent paraformaldehyde) and 1 mol of paraphenolsulfonic acid per 1.1–1.8 mols of total formaldehyde. This three component mixture thus formed can be used in making an ion exchange membrane less susceptible to damage on shrinkage.

In another form, about 0.1 mol of aniline per mol of contained paraphenolsulfonic acid is added to the pure paraphenolsulfonic acid prior to its mixture with a formalin-paraformaldehype combination.

Paraformaldehyde is sometimes mentioned as being useful to form aqueous formaldehyde or formalin solutions to gain higher purity formalin as in Kasper, 2,702,272. However, it was not recognized prior to the unexpected findings of this invention that the combination of solid paraformaldehyde with formalin without additional water, when used as a starting mixture in the formation of the paraphenolsulfonic acid-formaldehyde condensate resin, would result in an ion exchange membrane of unusual structural stability under conditions at which shrinkage occurred, as through loss of water from the resin.

The use of paraformaldehyde along with formalin instead of the formalin alone has a number of other advantages. The handling of the paraformaldehyde is much easier than the handling of the pure formalin solution because the paraformaldehyde, being a solid and being added as a solid, takes time before it goes to solution. It cannot readily react to cross-link the paraphenolsulfonic acid until it does go into solution so that there is a definite shelf life time advantage over using formalin solution alone. The paraformaldehyde does not totally go into solution until sometime during the curing process. This will allow, during the pre-cure stage, a much milder exothermic reaction which takes place over a longer period of time than would a reaction involving formalin alone. For example, in using formalin alone as little as 5 seconds can be the difference between an under-cured and an over-cured membrane. Through the use of solid paraformaldehyde the reaction is insensitive for at least a half minute.

Furthermore, the addition of a small amount of aniline to this unusual combination not only resulted in improved dimensional stability but it also greatly improved the strength of the resin.

During the operation of a fuel cell, including a reinforced cation exchange resin membrane of the phenolsulfonic acid type and in which oxygen and hydrogen are reactant gases, water is released on the oxygen side at the expense of the hydrogen side. Because the resin is generally fully hydrated prior to operation, the oxygen side of the resin will remain dimensionally stable except in cases where the cell is operated in air in which case the oxygen side is dehydrated more rapidly than the hydrogen side. Thus, dehydration of either or both sides can occur depending on whether oxygen or ambient air is used as the oxidizer source. Dehydration can then progress to a point at which excessive tension in the resin causes cracking or formation of holes. This destroys the physical barrier existing between the two reactant gases.

The improved resin of this invention will operate better in a fuel cell. Because during operation the resin of a membrane is normally at least partially dehydrated. This dehydration causes a shrinkage of the resin and a stress condition exists in the membrane. The improved resin of this invention will provide for less stress in the membrane and afford better operation.

The method used to make ion exchange resins prior to this invention started with materials having a higher water content as well as contaminations of phenol, sulfuric acid and water in the phenolsulfonic acid. The method of this invention includes none of these contaminations, thus to result in a resin of higher purity than the known resins. One of the best resins formed by such known methods, because of the higher water content of its starting ingredients, includes about 34% water in the "as molded" condition compared with about half that amount in the "as molded" resin made according to the method of this invention.

Referring to the drawing in which the abscissa represents percent water in a resin and the ordinate represents change in stress in a constant dimension structure, a known resin made with relatively high water content is represented by point A at a neutral stress level represented by point $a$; the resin of this invention with a lower water content is represented by point B at a neutral stress level represented by point $b$. Point C represents a low water content at which an ion exchange resin membrane can operate in a fuel cell, for example 15% of saturation, with point $c$ representing a stress condition at that water content. Although ion exchange membranes can be made without supporting structures, it is preferred in the manufacture of ion exchange membranes for fuel cell applications that a supporting or reinforcing skeleton such as a thin cloth be used.

Prior to operation in a fuel cell, such a cloth-strengthened membrane is fully hydrated because of water losses which occur during operation. Hydration results in swelling of the membrane, which, in the drawing, would result in a change in stress level of from points $a$ to $d$ in known membranes and a larger change of from points $b$ to $d$ in the membrane of this invention.

Swelling puts a compression force on the resin and a tension force on the reinforcing structure of the membrane. Because the reinforcing structure can be selected to be relatively non-elastic in order to absorb such a tension force, no harm can come to the membrane using the resin made by the method of this invention even though the forces to which it is subjected from swelling are greater than those to which known resins are subjected from swelling in the same membranes. However, during shrinkage such as due to water loss, the forces are reversed and the resin now is under tension. Excessive shrinkage will cause known membranes to crack or to pull away from the reinforcing structures thus causing openings or holes which reduce the usefulness of the membrane in fuel cell applications.

As seen in the drawing, the change in stress level in known membranes is "$a$" to "$c$" as water is depleted, for example to point C. On the other hand, the membrane made according to the method of this invention is subjected to a lower tension force on shrinking as shown by the smaller change in stress level from $b$ to $c$.

Because the tension rather than the compression forces are more damaging to the resin of a reinforced membrane, this invention provides a resin which can more readily withstand damaging forces on shrinking.

Thus casting or polymerizing a resin with as much as 50% less water present results in a humidity-stress relationship where the zero stress condition formed at polymerization is at a mid-point of the possible humidity range.

In a preferred method for making the improved resin of this invention, 200 grams of paraphenolsulfonic acid was added to 70 grams of formalin solution (37% by weight formaldehyde in water). The addition can be made at as low a temperature as possible without freezing the mix, and up to a temperature below that at which reaction occurs. It has been found that such a range lies between about −5° C. and +15° C. with about +10° C. being a preferred temperature. After this addition was completed, 26 grams of paraformaldehyde was added to this mix in ultrafine powdered form (less than 400 mesh). Thus the ingredients in this example consisted of by weight 66% paraphenolsulfonic acid, 9% formaldehyde, 16% water (25% formalin) and 10% paraformaldehyde. Although the paraphenolsulfonic acid added in this example was 1 mol to 1.5 mols of total formaldehyde, the preferred range is 1 mol of paraphenolsulfonic acid to 1.2–1.7 mols of total formaldehyde in the formalin-paraformaldehyde mixture within the range of this invention.

Although it is desirable to make this final powdered paraformaldehyde addition at as low a temperature as possible, it was found in this example that because of the small amount of water in the mixture, the temperature must be maintained no lower than about 5° C. for this latter addition. The mixture was then stirred to thoroughly mix the materials, for example for about 2 hours. Through use of 100% pure solid paraformaldehyde in powdered form, the "as cast" or "as molded" water content of the resin has been reduced. Because of the use of this invention of 100% pure phenolsulfonic acid rather than the 90% pure phenolsulfonic acid reported in known methods, contaminations of excess free phenol and sulfuric acid have been eliminated.

The resin was then ready to be made into a membrane, although it can be stored for an indefinite period of time at about 0° C. A preferred method for making membranes is to pour the aged mixture at about 5° C. onto a piece of reinforcing cloth. In this example a cloth made of an acrylonitrile polymer, sometimes referred to as "Orlon," was used as a reinforcing cloth or skeleton. The cloth and resin was then placed in a sandwich between two plates, such as of glass or a smooth plastic, after which it was placed in a press to form the type of membrane desired. Although the temperature of the press can in this process be operated between about 50° C. and 110° C., we prefer to use the temperature 75° C. The pressure and time required for processing is that which is sufficient to form a type of membrane desired. As little as 1 p.s.i. can be applied, for example, for about 2 hours, to assure formation of a sheet. From 1 to 20 hours can be used to form the sheet depending on the desired final product. The final product is a continuous ion exchange resin membrane strengthened by a reinforcing inert cloth.

Although the membrane which resulted from this method was stronger and had more stability and resistance to shrinkage forces than did membranes made from a mixture of paraphenolsulfonic acid and formalin by known methods, it was found that even greater dimensional stability and strength can be achieved in a membrane, in another form of the invention, by following the procedure of the above described example except that about 0.1 mol of aniline per mol of contained paraphenolsulfonic acid was added to the pure 100% paraphenolsulfonic acid at about 75° C. This mixture was heated for about 2 hours with strong mixing, after which it was added to the formalin solution which was then used as described above.

The result was a material which was much stronger than the material not including aniline. Through this combination of resistance to damaging shrinking forces and the high strength properties obtainable through the addition of aniline, this form of the invention provides an unexpectedly greater improvement in strength and dimensional stability in membranes particularly useful in fuel cell applications.

Through the practice of this invention it is possible to make thinner, more stable membranes which can be stroded unprotected at relatively dry ambient conditions without cracking as do membranes made by known methods and from known resins.

Although it is difficult to make stress measurement tests on resin membranes including a reinforcing cloth because the measurement would be primarily made on the cloth, one of the best tests is one in which a membrane is clamped in a frame and the humidity around it is changed. If the resin pulls away from the frame or from the cloth or it cracks in comparison with other membranes run under the same conditions at the same time, it would be a measure of the relative value of one membrane over another.

A test was performed on two membranes to determine their relative resistance to internal stresses. Both membranes were prepared according to the first example above except that in one of the membranes paraformaldehyde was not substituted for any portion of the formalin solution. Both of the membranes were soaked in water and then clamped in a frame. After subjecting the resins to the same dehumidifying conditions, the membranes were observed for the formation of holes in the membrane principally in the interstices of the cloth. Cracking and pulling away from the frame were also studied. The membrane made according to this invention and including the substitution of paraformaldehyde for the formalin solution appeared to be continuous and without holes or fractures. The membrane not including the paraformaldehyde substitution for a portion of the formalin solution was cracked and crazed and included a number of perforations.

Therefore, this invention provides a method for making an improved ion exchange resin and a membrane from that resin having a greater resistance to internal shrinkage on dehydration, unexpectedly achieved by adjusting the water content of the components used in the manufacture of the resin.

Although this invention has been described in connection with specific examples, it will be understood by those skilled in the art the modifications and variations of which the invention is capable.

What is claimed is:

1. A method of making an ion exchange resin membrane comprising the steps of: making a mixture of formalin, paraformaldehyde and paraphenolsulfonic acid such that the mixture consists essentially of 1–3 parts by weight of formalin, 1 part by weight of paraformaldehyde, and 1 mol of paraphenolsulfonic acid per 1.1–1.8 mols of total formaldehyde, said mixture being made within the temperature range of about $-5°$ C. to $+15°$ C.; impregnating a porous structure with the mixture; and then curing the impregnated structure under sufficient pressure to form a continuous membrane.

2. A method of making an ion exchange resin membrane comprising the steps of: making a mixture of formalin, paraformaldehyde and paraphenolsulfonic acid such that the mixture consists essentially of 1–3 parts by weight of formalin, 1 part by weight of paraformaldehyde, 1 mol of paraphenolsulfonic acid per 1.1–1.8 mols of total formaldehyde, and about 0.1 mol of aniline per mol of contained paraphenolsulfonic acid, said mixture being made within the temperature range of about $-5°$ C. to $+15°$ C., impregnating a porous structure with the mixture; and then curing the impregnated structure under sufficient pressure to form a continuous membrane.

3. A method of making an ion exchange resin membrane comprising the steps of: making a mixture of formalin, paraformaldehyde and paraphenolsulfonic acid such that the mixture consists essentially of 1 part by weight of formalin, 1 part by weight of paraformaldehyde, and 1 mol of paraphenolsulfonic acid per 1.5 mol of total formaldehyde, said mixture being made at about $+10°$ C.; impregnating a porous structure with the mixture; and then curing the impregnated structure from 1 to 20 hours at 50° C.–110° C. at a pressure sufficient to form a continuous membrane.

4. A method of making an ion exchange resin membrane comprising the steps of: mixing about 66 weight percent paraphenolsulfonic acid with about 25 weight percent formalin solution at a temperature between $-5°$ C. and $+15°$ C., adding about 10 weight percent powdered paraformaldehyde to the mixture at about 5 to 15° C.; thoroughly mixing the paraphenolsulfonic acid, the paraformaldehyde and the formalin between 5 to 15° C. to form a cooled mixture, impregnating a porous cloth with the cooled mixture; and then curing the impregnated cloth at a temperature of about 75° C. for about 2 hours under a pressure of 2 to 2000 p.s.i.

5. A method of making an ion exchange resin membrane comprising the steps of: making a first mixture of aniline and paraphenolsulfonic acid containing 0.1 mol aniline per mol of paraphenolsulfonic acid, mixing about 66 weight percent of the first mixture with about 25 weight percent formalin solution at a temperature between $-5°$ C. and $+15°$ C. to make a second mixture; adding about 10 weight percent powdered paraformaldehyde to the second mixture at about 5 to 15° C.; thoroughly mixing the paraphenolsulfonic acid, the paraformaldehyde and the formalin between 5 to 15° C. to form a cooled mixture; impregnating a porous cloth with the cooled mixture; and then curing the impregnated cloth at a temperature of about 75° C. for about 2 hours under a pressure of 2 to 2000 p.s.i.

References Cited by the Examiner

UNITED STATES PATENTS

| | | | |
|---|---|---|---|
| Re. 24,222 | 9/56 | Patnode | 204—195 |
| Re. 24,865 | 9/60 | Juda | 204—98 |
| 2,431,251 | 11/47 | Holmes | 260—2.1 |
| 2,448,029 | 8/48 | Hausted | 260—2.2 |
| 2,477,328 | 7/49 | Day | 260—2.2 |
| 2,485,485 | 10/49 | Dudley | 210—37 |
| 2,636,852 | 4/53 | Juda | 260—2.2 |
| 2,702,272 | 2/55 | Kasper | 204—151 |
| 2,730,768 | 1/56 | Clarke | 18—58 |
| 2,741,591 | 4/56 | Dewey | 204—180 |
| 2,756,202 | 7/56 | Clarke | 260—2.2 |
| 2,855,371 | 10/58 | Abrams | 260—2.1 |
| 2,913,511 | 11/59 | Grubb | 136—86 |
| 2,951,818 | 9/60 | Haagan | 260—2.2 |

OTHER REFERENCES

Carswell: Phenoplasts, pages 221–222, Interscience Pub., New York (1947).

Martin: The Chemistry of Phenolic Resins, pages 110–111, John Wiley, New York (1956).

WILLIAM H. SHORT, *Primary Examiner.*

H. N. BURSTEIN, *Examiner.*